US010354516B2

(12) United States Patent
Frenette

(10) Patent No.: US 10,354,516 B2
(45) Date of Patent: Jul. 16, 2019

(54) METHOD AND APPARATUS FOR AUTOMATED ACTIVATION OF A SECURITY SYSTEM

(75) Inventor: Stéphan Frenette, Montreal (CA)

(73) Assignee: TYCO SAFETY PRODUCTS CANADA, LTD., Concord, Ontario (CA)

( * ) Notice: Subject to any disclaimer, the term of this patent is extended or adjusted under 35 U.S.C. 154(b) by 1633 days.

(21) Appl. No.: 11/521,876

(22) Filed: Sep. 15, 2006

(65) Prior Publication Data

US 2008/0072314 A1 Mar. 20, 2008

(51) Int. Cl.
*H04L 29/00* (2006.01)
*G08B 25/14* (2006.01)

(52) U.S. Cl.
CPC .................................... *G08B 25/14* (2013.01)

(58) Field of Classification Search
USPC ................. 726/19; 340/506, 539; 455/404.1; 725/108
See application file for complete search history.

(56) References Cited

U.S. PATENT DOCUMENTS

| | | | | |
|---|---|---|---|---|
| 4,887,290 | A | 12/1989 | Dop et al. | |
| 5,125,021 | A | 6/1992 | Lebowitz | |
| 5,146,486 | A | 9/1992 | Lebowitz | |
| 5,185,779 | A | 2/1993 | Dop et al. | |
| 5,327,478 | A | 7/1994 | Lebowitz | |
| 5,402,101 | A | 3/1995 | Berger et al. | |
| 5,454,024 | A | 9/1995 | Lebowitz | |
| 5,675,626 | A | 10/1997 | Davis | |
| 5,946,616 | A | 8/1999 | Schomack et al. | |
| 6,411,802 | B1 | 6/2002 | Cardina et al. | |
| 6,686,838 | B1 | 2/2004 | Rezvani et al. | |
| 6,757,528 | B1 | 6/2004 | Cardina et al. | |
| 6,801,762 | B1 | 10/2004 | Huilgol | |
| 6,825,762 | B2 | 11/2004 | Giacopelli et al. | |
| 6,829,513 | B2 * | 12/2004 | Piersanti et al. | 700/83 |

(Continued)

FOREIGN PATENT DOCUMENTS

| | | |
|---|---|---|
| WO | WO 02/35359 A2 | 5/2002 |
| WO | WO 02/091325 A1 | 11/2002 |
| WO | 03075588 | 9/2003 |

OTHER PUBLICATIONS

Global Fire Equipment/ Junior V3 Fire Alarm Control Panal Installation and Commision Manual/ Sep. 2005/ Revision 2.3/pp. 1-65/.*

*Primary Examiner* — Brandon S Hoffman
*Assistant Examiner* — Michael D Anderson
(74) *Attorney, Agent, or Firm* — Arent Fox LLP

(57) ABSTRACT

A security system comprises at least one component interconnected with the security system for detecting an alarm condition. A control panel is interconnected with the security system for at least one of controlling and communicating with the at least one component. A memory is interconnected with the control panel for storing a system identifier (ID) associated with the control panel and for storing connection information for accessing a system configuration file associated with the system ID. The system ID and the connection information are stored prior to interconnecting the control panel and the security system. The system configuration file identifies the at least one component and is stored remote from the security system.

20 Claims, 5 Drawing Sheets

(56) References Cited

U.S. PATENT DOCUMENTS

| | | | | |
|---|---|---|---|---|
| 6,999,562 | B2 | 2/2006 | Winick | |
| 7,183,907 | B2 * | 2/2007 | Simon et al. | 340/531 |
| 2003/0190906 | A1 * | 10/2003 | Winick | 455/404.1 |
| 2004/0086091 | A1 * | 5/2004 | Naidoo et al. | 379/37 |
| 2005/0237182 | A1 * | 10/2005 | Wang | 340/539.1 |
| 2006/0003778 | A1 * | 1/2006 | Hogdahl et al. | 455/466 |
| 2006/0107298 | A1 * | 5/2006 | Friar | 725/108 |
| 2006/0176167 | A1 * | 8/2006 | Dohrmann | 340/506 |

* cited by examiner

METHOD AND APPARATUS FOR AUTOMATED ACTIVATION OF A SECURITY SYSTEM

BACKGROUND OF THE INVENTION

This invention relates generally to security systems, and more particularly, to simplifying and improving aspects of the installation of security systems.

The physical installation of a security system often requires a number of different vendors to go on-site. For example, an electrician may wire the system and one or more vendors may install various components which are to be monitored by the system, such as alarm sensors and indicators. An installer also physically installs and then programs the system control panel on-site, telling the panel what components are connected, how many components are connected, and the like.

Depending upon the size of the installation, the time to program can be long. In addition, the initialization of the system may be delayed while waiting for one or more of the vendors to be on-site for the installation, while arranging for the vendors to complete their work in the proper order, and while waiting for the installer to program the panel. Also, due to the large number of installations, many installers need to be available to travel to each customer's site to complete the programming. The cost of man-power is quite high, and changes in scheduling can cause additional aggravation and delay for the customer.

An additional problem is experienced when the security system uses a mobile or wireless communication service, such as cellular, internet, or satellite, rather than plain old telephone line system (POTS) to connect with the security monitoring service. When the components of the security system are ordered, a wireless card that will be installed within a control panel of the system is also ordered from a wireless service provider. The wireless service provider activates the wireless card and starts billing the installer as soon as it is sent to the installer, even though the installation has not been completed. Also, the wireless card may sit in a warehouse or vehicle for a length of time, during which the installer is billed for the wireless service being provided to the uninstalled wireless card.

Therefore, a need exists for simplifying the installation of security systems using wireless communication technologies, as well as lowering the costs associated with the installation.

BRIEF DESCRIPTION OF THE INVENTION

In one embodiment, a security system comprises at least one component interconnected with the security system for detecting an alarm condition. A control panel is interconnected with the security system for at least one of controlling and communicating with the at least one component. A memory is interconnected with the control panel for storing a system identifier (ID) associated with the control panel and for storing connection information for accessing a system configuration file associated with the system ID. The system ID and the connection information are stored prior to interconnecting the control panel and the security system. The system configuration file identifies the at least one component and is stored remote from the security system.

In another embodiment, a method for installing a security system comprises storing a first system ID and connection information in a control panel of a security system. The first system ID and the connection information are stored prior to interconnecting the control panel and the security system. The control panel uses the connection information to communicate with a configuration module located remote from the security system. The configuration module stores system configuration files for at least one security system. A first system configuration file is transmitted from the configuration module based on the first system ID.

In another embodiment, a security system comprises at least one component interconnected with a security system for detecting an alarm condition. A control panel is interconnected with the security system for at least one of controlling and communicating with the at least one component. A first memory is interconnected with the control panel for storing a system ID associated with a wireless communication service provided by a wireless service provider. An I/O port is interconnected with the control panel and uses the wireless communication service for downloading a system configuration file to the control panel. The system configuration file identifies the at least one component and is stored remote from the security system.

Figure 1:
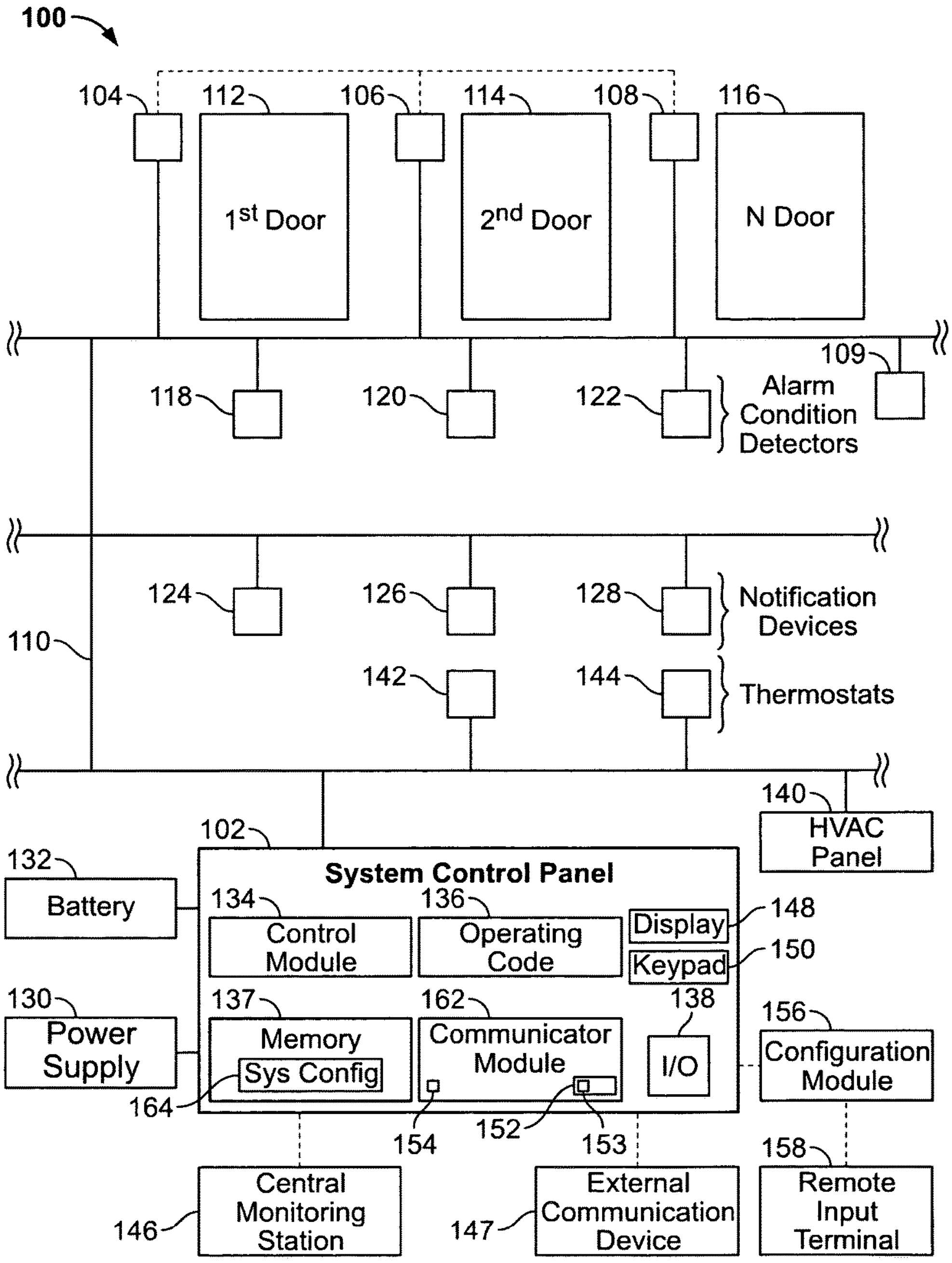
FIG. 1 illustrates a security system which has a system control panel for monitoring and/or controlling devices and components installed on a network in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION OF THE INVENTION

FIG. 1 illustrates a security system 100 which has a system control panel 102 for monitoring and/or controlling devices and components installed on a network 110. The devices may detect and/or control door openings and closings, detect alarm conditions, notify people within an area about alarm conditions, track and/or control temperature, or accomplish other functions which may be desired. For example, the system 100 may be used within a light industrial building or a residence.

The system 100 has one or more sensors, such as first sensor 104, second sensor 106, through N sensor 108 which may be configured to control and/or monitor first door 112, second door 114, through N door 116, respectively, and are interconnected with the system control panel 102 over the network 110. One or more motion detectors 109 may be used to sense motion and other sensors (not shown) may be used to monitor windows (not shown) or other areas of interest. Each of the sensors 104, 106, 108, and 109 has a unique address on the network 110.

Alarm condition detectors 118, 120 and 122 may be connected on the network 110 and are monitored by the system control panel 102. The detectors 118-122 may detect fire, smoke, temperature, chemical compositions, or other hazardous conditions. When an alarm condition is sensed, the system control panel 102 transmits an alarm signal to one or more addressable notification devices 124, 126 and/or 128 through the network 110. The addressable notification devices 124, 126 and 128 may be horns and/or strobes, for example. A heating, ventilation and air-conditioning (HVAC) panel 140 and one or more thermostats 142 and 144 may also be communicating with the system control panel 102 on the network 110.

A central monitoring station 146 may receive communications from the system control panel 102 regarding security problems and alarm conditions. The central monitoring station 146 is typically located remote from the system 100 and provides monitoring to many alarm systems.

The system control panel 102 is connected to a power supply 130 which provides one or more levels of power to the system 100. One or more batteries 132 may provide a back-up power source for a predetermined period of time in the event of a failure of the power supply 130 or other incoming power. Other functions of the system control panel 102 may include showing the status of the system 100, resetting a component, a portion, or all of the system 100, silencing signals, turning off strobe lights, and the like.

The system control panel 102 has a control module 134 which provides control software and hardware to operate the system 100. Operating code 136 may be provided on a hard disk, ROM, flash memory, stored and run on a CPU card, or other memory. An input/output (I/O) port 138 provides a communication interface at the system control panel 102 wirelessly and/or via a cable (not shown) with the external communication device 147 such as a laptop computer.

The network 110 is configured to carry power and communications to the addressable notification devices 124-128 from the system control panel 102. Each addressable notification device 124-128 has a unique address and may be capable of bi-directional communication with the system control panel 102. The addressable notification devices 124-128 may communicate their status and functional capability to the system control panel 102 over the network 110. The thermostats 142 and 144 may be controlled and monitored by the control module 134.

Vendors arrive on-site to physically install the devices and components of the system 100. Previously, after the physical installation was complete, an installer used either the external communication device 147 or a display 148 and keypad 150 provided on the system control panel 102 or a keypad (not shown) interconnected on the network 110 to configure the system 100 on-site. System configuration file 164 may be stored in the memory 137 of the system control panel 102 and may comprise data such as a serial number and part number for each component, and an address of each component on the network 110. As stated previously, this may be time consuming, especially for complex or large installations, and synchronizing the arrival of all parties needed for the installation may be difficult.

Therefore, a communicator module 162 having a subscriber identity module (SIM) card 152 installed therein may be provided within and/or interconnected with the system control panel 102. Each SIM card 152, or wireless identifier card, has a unique SIM identification number, which herein is referred to as a system identifier (ID) 153. The SIM card 152 may be provided by the wireless service provider. The system ID 153 is a unique character string, such as a cellular phone number, a wireless SIM card identifier (ID), IP address, or a media access control (MAC) address, and may be used to identify, authenticate, and/or track a change in configuration of the system 100, detect tampering with the communicator module 162 and/or SIM card 152, as well as request activation of a wireless account associated with the system ID 153 at a date subsequent to the date the wireless service provider shipped the SIM card 152.

Connection information 154 is provided, which may be a phone number, IP address or MAC address of a configuration module 156 which is located remote from the system. The system ID 153 and the connection information 154 are hard-coded prior to being installed in the system 100, and cannot be changed by an end user. The installer may input the system configuration into the configuration module 156 using a remote input terminal 158. The communicator module 162 may then download the system configuration file 164 or request that the configuration module 156 transmit the system configuration file 164.

Figure 2:
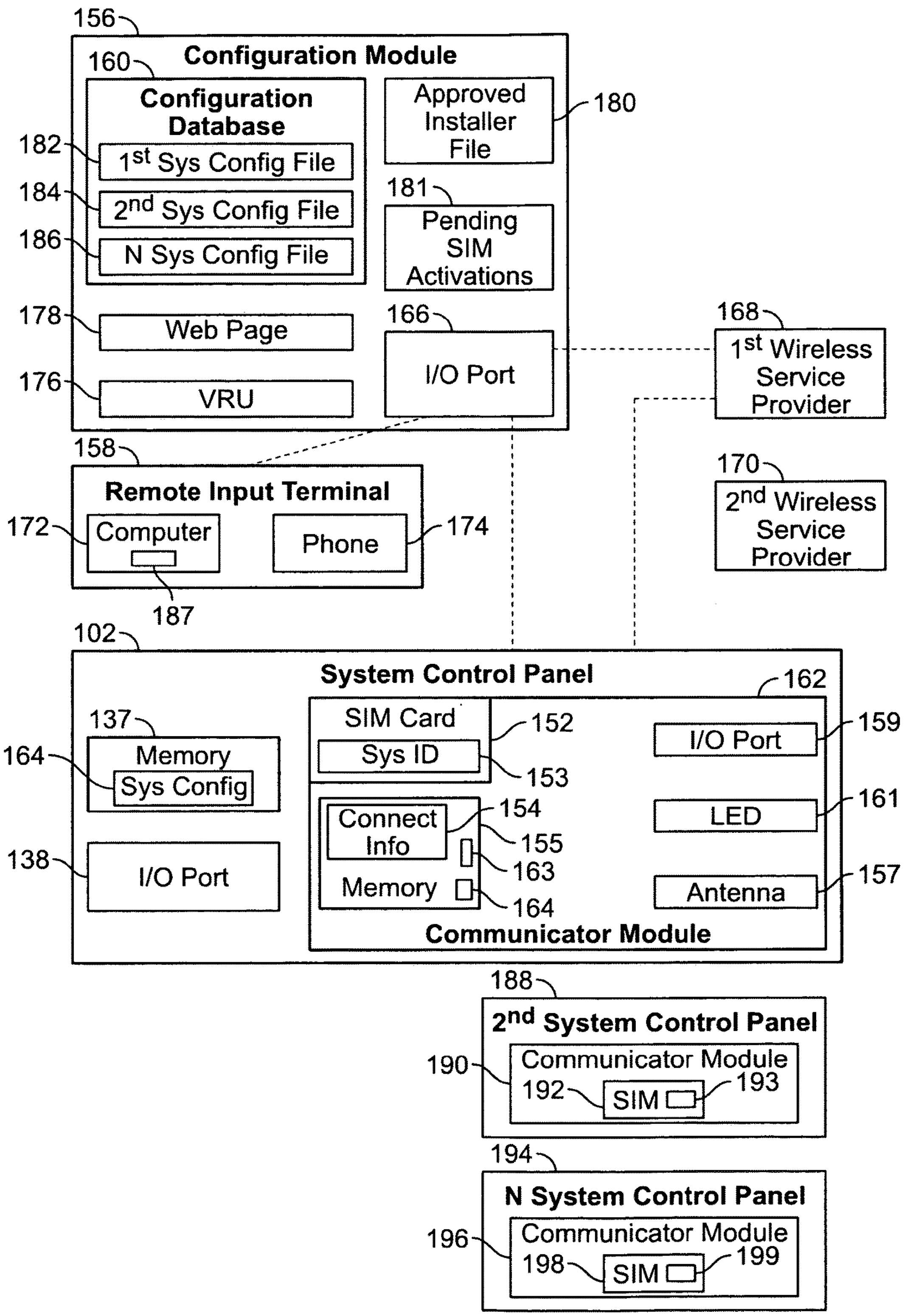
FIG. 2 illustrates a relationship between the configuration module, security systems such as the security system of FIG. 1, and the wireless service providers in accordance with an embodiment of the present invention.

FIG. 2 illustrates a relationship between the configuration module 156, security systems such as the security system 100 of FIG. 1, and the wireless service providers. The configuration module 156 may comprise one or more servers housed at a location having a defined phone number or IP address. One or more wireless service providers, such as first and second wireless service providers 168 and 170 are illustrated. The wireless service provider may be selected by the customer of the security system 100, and may be based on the location of the physical installation of the security system 100. For example, the first wireless service provider 168 may provide wireless service to a first region located in Canada while the second wireless service provider 170 provides wireless service to a second region located in the United States. Wireless service may be cellular, satellite or other wireless communication technology.

The configuration module 156 has a configuration database 160 for storing configuration information related to one or more security systems, such as first, second, through N configuration files 182, 184 and 186. The installer may use the remote input terminal 158, which may be a computer 172 or phone 174, for example, to interface with the configuration module 156 using I/O port 166.

The communicator module 162 within the system control panel 102 may comprise the SIM card 152 having the system ID 153. A memory 155 may be used to store data such as the connection information 154, as discussed previously, and may optionally store the system configuration file 164. An antenna 157 may be used to facilitate wireless communication. An I/O port 159 may also provide one or more methods of communication including wireless capability, and an LED 161 or other display may display a status of the communicator module 162 and/or the system control panel 102.

Figure 3:
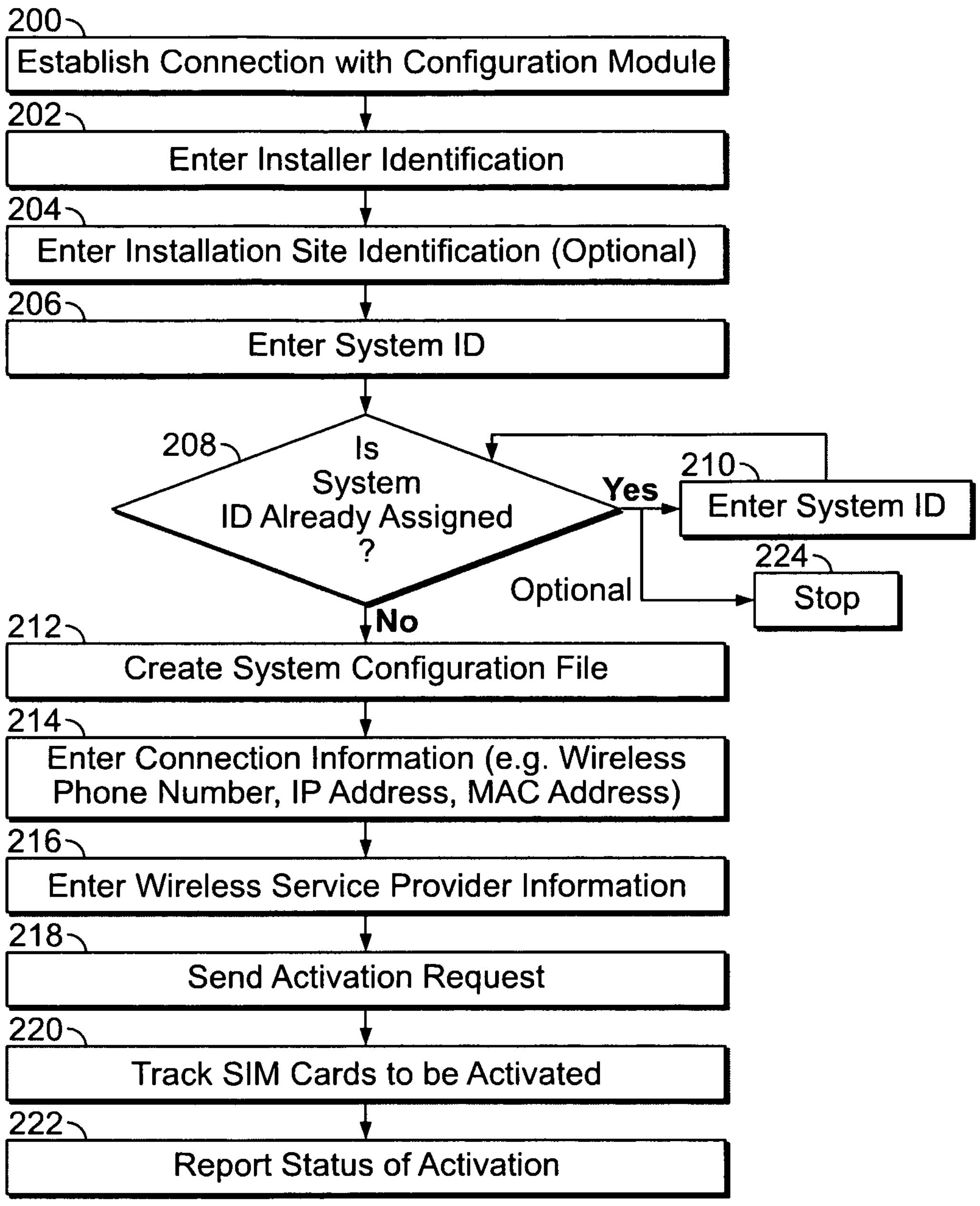
FIG. 3 illustrates an automated method for remotely activating the wireless subscriber identity module (SIM) card of the system of FIG. 1 in accordance with an embodiment of the present invention.

FIG. 3 illustrates an automated method for remotely activating the SIM card 152 of the system 100. By activating the SIM card 152, a wireless communication account associated with the system 100 (or the system control panel 102) is activated at a desired time, lessoning the length of time the installer is billed while the wireless communication service is not being used for monitoring the system 100. It should be noted that the method of FIG. 3 may be accomplished remote from the system 100.

At 200, the installer establishes connection with the configuration module 156 using the remote input terminal 158. The installer may call a voice response unit (VRU) 176 or connect over the internet to a webpage 178. The VRU 176 and/or the webpage 178 provide interactive access to the configuration database 160. For example, if the installer is using the phone 174, the installer may call the VRU 176, listen to voice prompts requesting information, and enter data from the keypad of the phone 174. If the installer is using the computer 172, the installer may use an internet connection to access the webpage 178; then enter information into a form using an input device such as a keyboard.

At 202, the installer enters their installer identification which the configuration module 156 may compare to an approved installer file 180, which may be a table or list, for example, of all approved installers. The installer identification may include such information as name, an identification number, a pin number, and the like. At 204, the installer optionally may enter site identification data, which may be a character string, number string, code, or address identifying the physical location of the system 100.

At 206, the installer enters the system ID 153. At 208, the configuration module 156 compares the system ID 153 to system IDs already assigned to other security systems. If the system ID 153 is assigned to another security system, the method passes to 210 where the installer may re-enter the system ID 153. The method then returns to 208 where the configuration module 156 again compares the system IDs. Therefore, if the installer enters an incorrect system ID at 206, one or more additional opportunities may be provided to re-enter the correct system ID 153. Optionally, if the configuration module 156 determines that the system ID 153 is being used by another security system, the method may stop at 224.

If the configuration module 156 determines that the system ID 153 is available for use, the method passes to 212. At 212, if not already created, the configuration module 156 may create a system configuration file, such as the first system configuration file 182, to be populated with installation parameters and/or component data associated with the installation site ID, the system ID, and/or any subsequently entered data used to configure, activate, and/or track components and status of the system 100.

At 214, the installer enters the connection information 154, which may be a wireless phone number, a wireless SIM card ID, IP address, or MAC address that has been assigned to the communicator module 162. Other types of addresses and identifiers may be used. At 216, the installer may optionally select or enter the wireless service provider information, such as by selecting the first or second wireless service provider 168 or 170. At 218, the configuration module 156 sends a service activation request to the selected wireless service provider, requesting that the wireless communication account associated with the SIM card 152 and system ID 153 be activated. Optionally, the configuration database 160 may store the service activation request along with any other activation requests which are received within a period of time, such as two hours, four hours, or twenty-four hours; then transmit all of the service activation requests to the wireless service provider in a batch file. The wireless service provider will activate the SIM card 152 (as well as other SIM cards requesting activation) within a predetermined amount of time, such as on receipt of the request or within 24 hours.

At 220, the configuration module 156 may track the SIM card 152 as pending activation. A list of pending SIM activations 181 may be reviewed automatically and/or periodically by the configuration module 156 to ensure that the SIM card 152 is activated within the predetermined amount of time. At 222, the configuration module 156 may send a voice, text, or email message to the installer advising the activation status of the SIM card 152. For example, the message may be sent after the wireless service provider has activated the SIM card 152 and the configuration module 156 has updated the list of pending SIM activations 181.

Optionally, the installer may check back at another time to determine the activation status of the SIM card 152. The installer may call the VRU 176 or input the system ID 153 on the webpage 178 to view the status as not activated or activated, along with the activation date.

Figure 4:
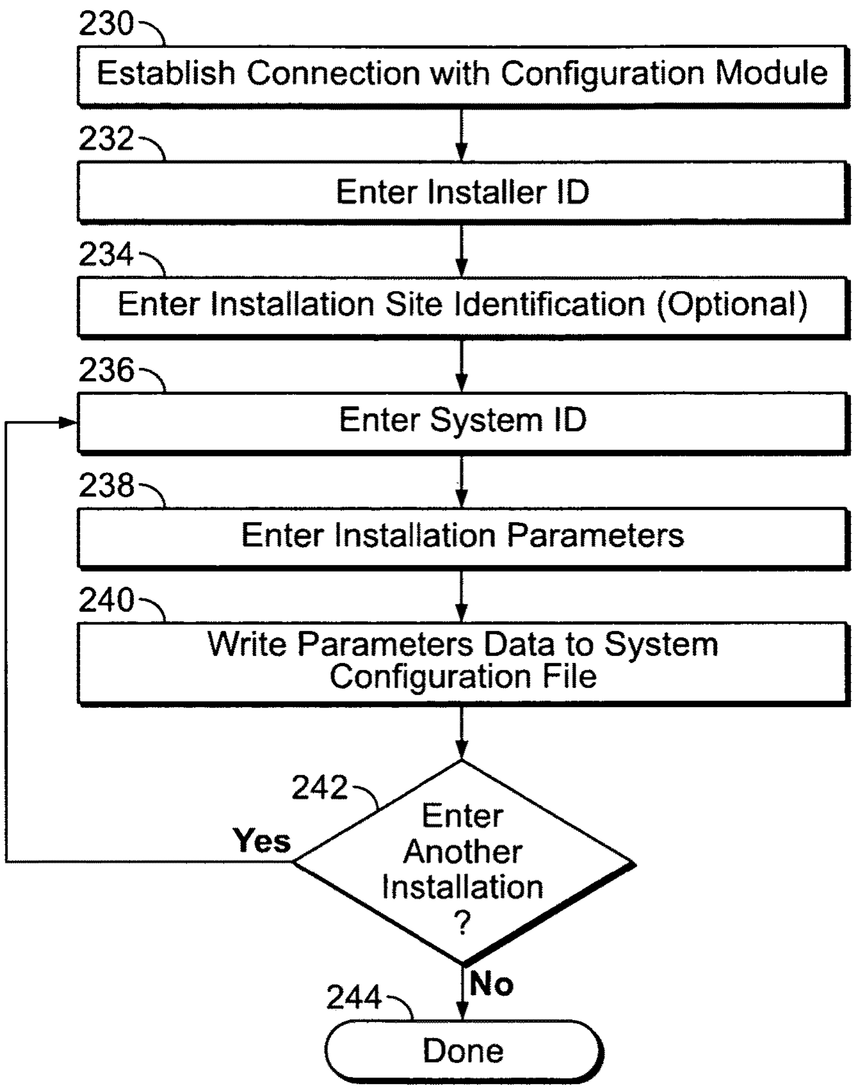
FIG. 4 illustrates a method for remotely creating the system configuration file in accordance with an embodiment of the present invention.

FIG. 4 illustrates a method for remotely creating the system configuration file 164. The specific configuration data may be entered into the configuration database 160 prior to the actual physical installation at the convenience of the installer. At 230, the installer establishes connection with the configuration module 156. At 232, the installer enters their installer identification, and at 234, the installer optionally may enter site identification data, which may be a character string, code, or address identifying the physical installation of the site. At 236, the installer enters the system ID 153, which may be the wireless phone number, a wireless SIM card ID, IP address or MAC address that has been assigned to the communicator module 162.

At 238, the installer enters installation parameters based on the configuration of the system 100. A plan is prepared for each system 100 prior to the physical installation which identifies each component to be installed, the installation location for each component, and the network address, as well as other installation parameters and/or data which may be needed. For example, several components of the system 100 are the alarm condition detectors 118, 120 and 122. The installer enters data such as the product model number, serial number, and a network address for each unit. At 240, the configuration database 160 writes the parameters data to the associated system configuration file, such as the first system configuration file 182 which is associated with the system ID 153 and/or the SIM card 152 of the system 100. At 242, if another installation is to be entered, the method returns to 236. If all installations have been entered, the method passes to 244 and is complete. The configuration module 156 saves the first system configuration file 182 which may later be retrieved and downloaded remotely by the system 100, or transmitted by the configuration module 156, to be saved as the system configuration file 164 in the memory 137 of the system control panel (FIG. 2).

Alternatively, a file of component data 187 (FIG. 2) or installation parameters may be electronically prepared separate from the configuration module 156. For example, a software module or program used to build the system 100 prior to physical installation may automatically prepare the file of component data 187 which the installer may transmit electronically to the configuration module 156 to populate the first system configuration file 182.

Referring to FIG. 2, if the system 100 is large, a second system control panel 188 having a second communicator module 190, second SIM card 192 with second system ID 193 may be used and associated with the second system configuration file 184. The SIM card 152 and second SIM card 192 have different system IDs, and are activated separate from one another regardless of their physical installation location. N system control panel 194, N communicator module 196, N SIM card 198, and N system ID 199, associated with the N system configuration file 186, may indicate a separate system installation. Therefore, separate system configuration files may be maintained for each system and/or system control panel as needed.

Figure 5:
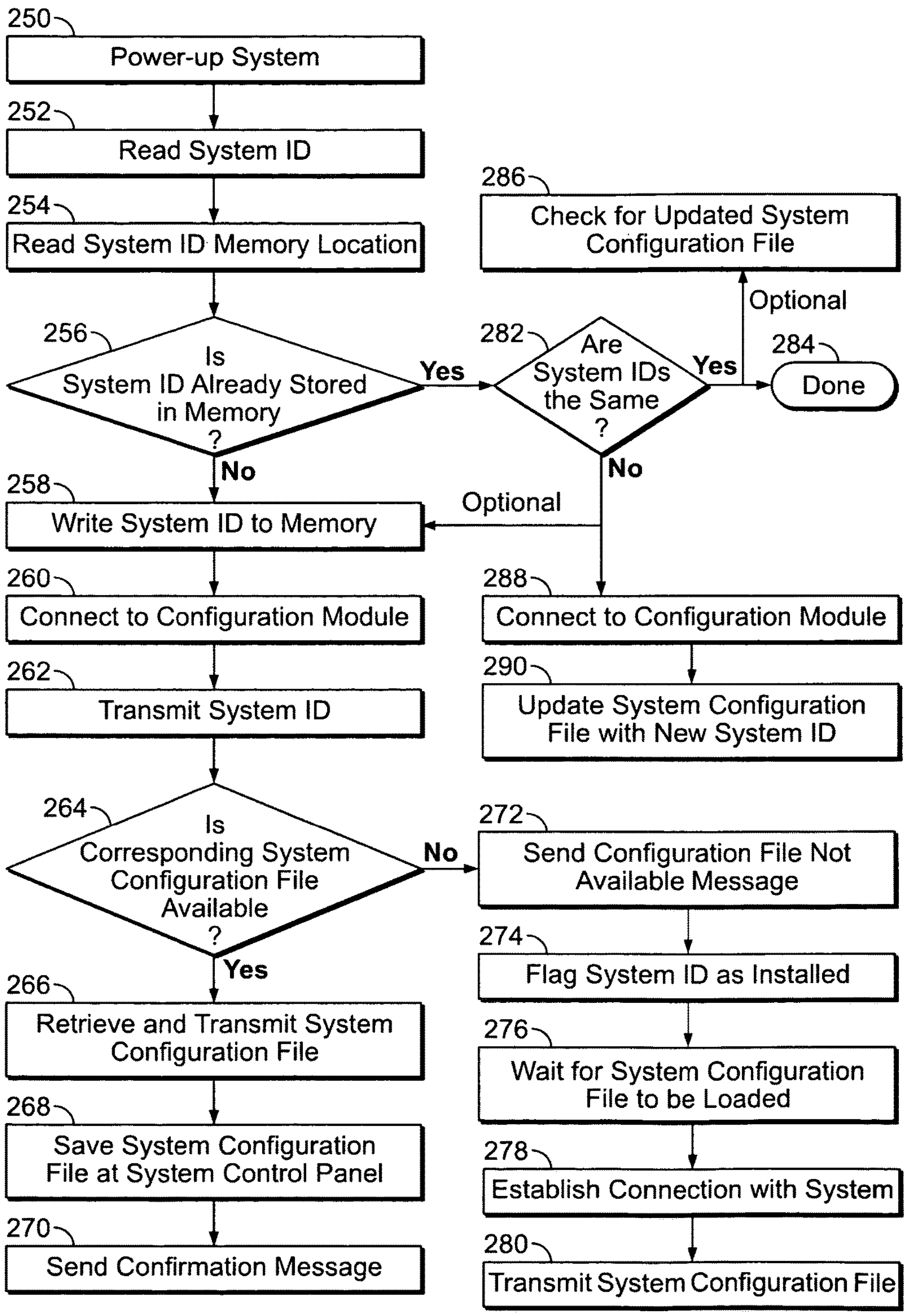
FIG. 5 illustrates a method for automatically programming the security system of FIG. 1 during an initial installation and for maintaining a current record of the system configuration over time in accordance with an embodiment of the present invention.

FIG. 5 illustrates a method for automatically programming the security system 100 during an initial installation and for maintaining a current record of the system configuration over time. At 250, the system control panel 102 is powered on. For example, the installer may power on the system control panel 102, or the electrician or other vendor who has completed the last portion of the installation process may power on the system control panel 102. Optionally, a specific button, selection, trigger, or entry sequence may be used to initiate the method.

At 252, the communicator module 162 reads the system ID 153 stored in the SIM card 152 (FIG. 1). As stated previously, the system ID 153 was hard-coded prior to the SIM card 152 being installed in the system 100. At 254, the communicator module 162 reads a system ID memory location 163 (FIG. 2) within the memory 155, and at 256 the communicator module 162 determines whether a system ID was read at 254. If a system ID was not read from the memory location 163, a system ID has not been previously stored and at 258, the communicator module 162 writes the system ID 153 of the SIM card 152 to the memory location 163.

At 260 the communicator module 162 retrieves the connect information 154 from the memory 155 and attempts to connect to the configuration module 156, such as by dialing the phone number or connecting to the IP address. The connect information 154 was hard-coded prior to installation. Short message service (SMS) or other transmission protocol may be used. At 262, the communicator module 162 transmits the system ID 153 to the configuration module 156.

The configuration module 156 receives the system ID 153, and at 264, the configuration module 156 determines whether a corresponding system configuration file has been stored in the configuration database 160. If yes, the method passes to 266 where the configuration module 156 retrieves the corresponding system configuration file, such as the first system configuration file 182, and transmits the first system configuration file 182 to the communicator module 162. At 268, the communicator module 162 saves the first system configuration file 182 as the system configuration file 164 in the memory 137 of the system control panel 102. At 270, the communicator module 162 may send a confirmation message to the configuration module 156 to confirm that the system configuration file 164 has been successfully stored. The configuration module 156 may update the configuration database 160, and may optionally transmit an email, text, voice or other message to one or more parties, such as the installer, confirming the successful installation.

Returning to 264, if a system configuration file associated with the system ID 153 is not stored in the configuration database 160, at 272 the configuration module 156 may transmit a system configuration file not available message to the communicator module 162. Optionally, the confirmation module 156 may transmit an email, text, voice or other message to the installer, indicating that the system configuration file needs to be entered. At 274, the configuration module 156 may flag the system ID 153 as being in an installed and ready state. At 276, configuration module 156 waits for the associated system configuration file to be loaded. Once the installer has entered the data for the first system configuration file 182 (FIG. 4), at 278 the configuration module 156 may establish a connection with the system 100 to transmit the first system configuration file 182 at 280.

Returning to 256, if a system ID is read from the memory location 163, at 282 the communicator module 162 compares the system ID 153 to the system ID read in 254. If the system IDs are the same, the system control panel 102 and/or the communicator module 162 may have been reset, and the method passes to 284 and is done. Optionally, if the system IDs are the same, the method may pass to 286 to check for an updated system configuration file stored at the configuration module 156.

Returning to 282, if the system IDs are different, the method optionally may pass to 258, where communicator module 162 writes the system ID 153 to the memory location 163, and the communicator module 162 connects to the configuration module 156 to retrieve the system configuration file as discussed previously (260-270). In addition, at 288 the communicator module 162 connects to the configuration module 156 and at 290, the configuration module 156 updates the first system configuration file 182 with the new system ID 153 to maintain the integrity of the configuration database 160. The configuration module 156 may also send an email, voice or text message to the installer advising that the system ID 153 has been changed and that the system configuration file has been downloaded or transmitted, if appropriate. Detecting different system IDs at 282 may indicate that the SIM card 152 has been replaced with another SIM card, but may also indicate a tamper condition wherein someone may have replaced the SIM card 152 and/or the system control panel 102 in an attempt to defeat the security system 100.

While the invention has been described in terms of various specific embodiments, those skilled in the art will recognize that the invention can be practiced with modification within the spirit and scope of the claims.

What is claimed is:

1. A security system, comprising:

at least one component to be interconnected with a security system for detecting an alarm condition;

a control panel to be interconnected with the security system, the control panel including memory and a processor configured to at least one of control and communicate with the at least one component;

the memory storing a system identifier (ID) associated with the control panel, the memory storing connection information associated with a remote configuration module that is located remote from the control panel;

the processor configured to:

retrieve the connection information from the memory and utilizing the connection information to connect to the remote configuration module, provide, to the remote configuration module, the system ID and a request for configuration information;

retrieve, from the remote configuration module, the configuration information that has been stored in connection with the system ID; and operate the control panel using the configuration information.

2. The system of claim 1, wherein the configuration information includes at least one of installation parameters, component data associated with an installation site, or data used to configure, activate, and/or track components of the system.

3. The system of claim 1, wherein, when the configuration information is not available at the remote configuration module, the processor receives a message indicating that the configuration information associated with the system ID is not available.

4. The system of claim 1, wherein the memory includes the connection information pre-programmed prior to interconnecting the control panel and the security system.

5. The system of claim 1, further comprising the remote configuration module located remotely from the control panel, the remote configuration module configured to enable an operator to activate communication service to the control panel using the system ID and the connection information.

6. The system of claim 1, further comprising a subscriber identity module (SIM) card, wherein the system ID is pre-programmed in the SIM card prior to the SIM card being installed in the control panel.

7. The security system of claim 1, wherein the system ID being one of a wireless phone number, a wireless SIM card identifier (ID), an internet protocol (IP) address, or a media access control (MAC) address.

8. The security system of claim 1, further comprising an I/O port located remote from the security system, the system configuration file being at least one of defined and populated by data input through the I/O port.

9. The system of claim 1, wherein the configuration information comprises a serial number or a part number for the at least one component interconnected with the security system.

10. A method for installing a security system that includes at least one component to be interconnected with the security system for detecting an alarm condition, and a control panel to be interconnected with the security system, the control panel configured to at least one of control and communicate with the at least one component, the method comprising:

storing, at the control panel, a system identifier (ID) associated with the control panel;

storing, at the control panel, connection information associated with a remote configuration module that is located remote from the control panel;

utilizing the connection information to connect to the remote configuration module;

providing the system ID and a request for configuration information to the remote configuration module;

retrieving, from the remote configuration module, the configuration information that has been stored in connection with the system ID; and operating the control panel using the configuration information.

11. The method of claim 10, further comprising providing a subscriber identity module (SIM) card to be installed in the control panel, the system ID being stored in the SIM card prior to the SIM card being installed in the control panel.

12. The method of claim 10, wherein the connection information is stored at the control panel prior to interconnecting the control panel and the security system.

13. The method of claim 10, wherein the retrieving operation includes receiving a first system configuration file that includes the configuration information.

14. The method of claim 10, further comprising card coding the system ID onto a removable memory card before the card is installed in the control panel.

15. The method of claim 10, further comprising: installing a removable memory card into the control panel, determining whether the system ID was read from a memory location on the control panel, when the system ID was not read from the memory location on the control panel, writing the system ID from the removable memory card to the memory location on the control panel.

16. The method of claim 10, further comprising determining, at the remote configuration module, whether a corresponding system configuration file has been stored in a configuration database based on the system ID received; when the corresponding system configuration file exists, the remote configuration module transmitting the system configuration file to a communicator module at the control panel.

17. The method of claim 16, further comprising when a system configuration file is not stored in the configuration database, the configuration module transmitting a system configuration file not available message to the communicator module.

18. The method of claim 10, wherein the configuration information identifies the at least one component and is stored remote from the security system, the method further comprising initiating, at the control panel, the use of the connection information to access and download the configuration information after a predetermined event that is associated with the control panel occurs.

19. The method of claim 10, further comprising remotely inputting data associated with the security system to at least one of define and populate the configuration information.

20. The method of claim 10, further comprising activating a wireless communication account associated with the system ID of the security system at a time period defined by a user, the wireless communication account being provided by the wireless service provider.

* * * * *